United States Patent [19]

Arras et al.

[11] 4,053,723

[45] Oct. 11, 1977

[54] METHOD AND APPARATUS FOR MEASURING THE BIT ERROR FREQUENCY IN A CABLE CAUSED BY CROSSTALK BETWEEN LINE PAIRS DURING TRANSMISSION OF A 3-LEVEL CODED PCM SIGNAL

[75] Inventors: Juho Arras, Stockholm; Mats Örjan Mattsson, Farsta; Walter Herbert Erwin Widl, Bandhagen, all of Sweden

[73] Assignee: Telefonaktiebolaget L M Ericsson, Stockholm, Sweden

[21] Appl. No.: 686,561

[22] Filed: May 14, 1976

[30] Foreign Application Priority Data

May 28, 1975 Sweden .............................. 7506114

[51] Int. Cl.$^2$ .............................................. H04B 3/46
[52] U.S. Cl. ............................ 179/175.3 R; 178/69 A
[58] Field of Search .............. 179/175.3 R; 178/69 A, 178/69 B; 324/57 N

[56] References Cited

U.S. PATENT DOCUMENTS

| 3,745,266 | 7/1973 | Niedereder .................. 179/175.3 R |
| 3,890,470 | 6/1975 | Allen ................................ 324/57 N |

*Primary Examiner*—Douglas W. Olms
*Attorney, Agent, or Firm*—Hane, Sullivan & Spiecens

[57] ABSTRACT

A method and an apparatus for measuring the bit error frequency in a cable caused by crosstalk from at least one disturbing pair to a disturbed pair at transmission of a 3-level coded PCM signal utilizes the fact that a PCM signal transferred on a pair and the disturbances superimposed on this signal by crosstalk from other pairs are mathematically uncorrelated. The amplitudes of the disturbances measured on the disturbed pair are sampled after equalization in a regenerator with a sampling frequency which equals the bit time frequency of the PCM signal intended for transmission on the pair. The number of detected sampling values whose magnitude exceeds a certain threshold value is a function of the estimated bit error frequency.

9 Claims, 7 Drawing Figures

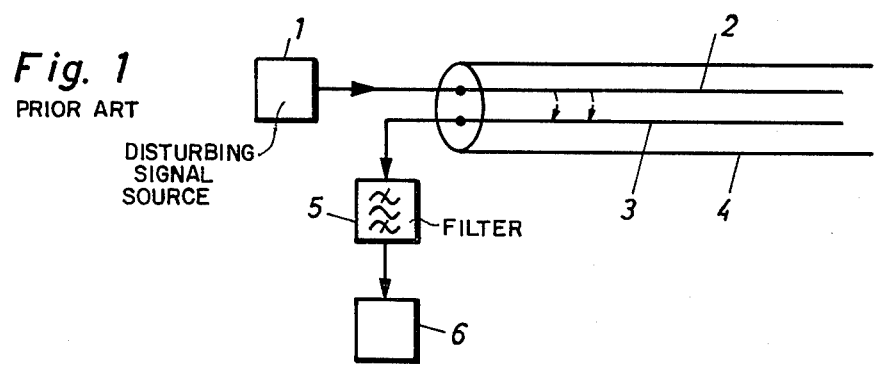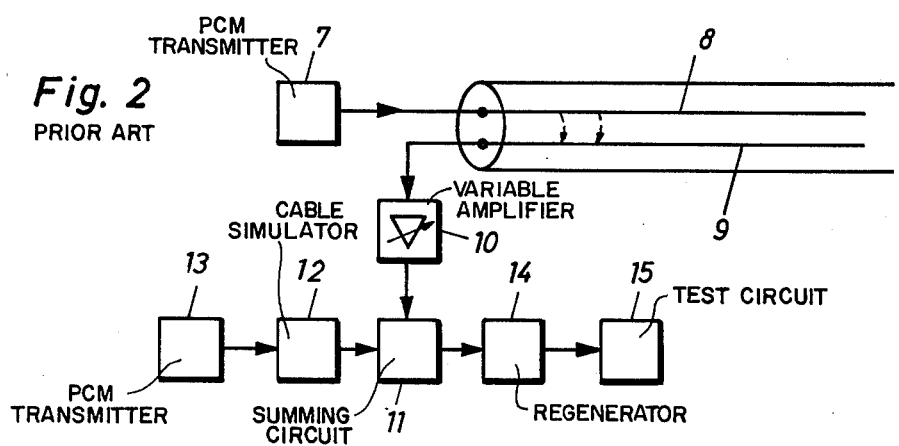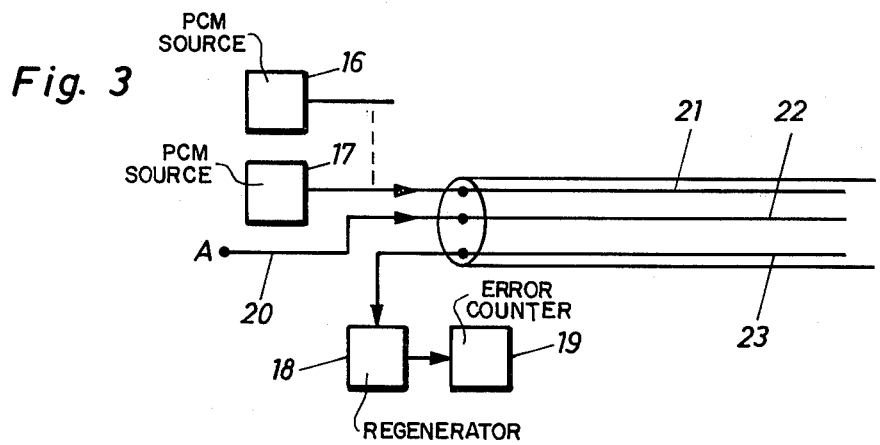

METHOD AND APPARATUS FOR MEASURING THE BIT ERROR FREQUENCY IN A CABLE CAUSED BY CROSSTALK BETWEEN LINE PAIRS DURING TRANSMISSION OF A 3-LEVEL CODED PCM SIGNAL

The present invention relates to a method and an apparatus for measuring the bit error frequency in a cable of the pair or quad type especially for telephony. The error frequency is caused by crosstalk from at least one disturbing pair on which is transmitted, for example, a PCM signal to a disturbed pair over a given length of the disturbed pair carrying a 3-level coded PCM system.

Within city areas it is becoming more difficult and consequently more expensive to lay new telephone cables and the interest for utilizing digital transmission techniques, for example by installing PCM primary multiplex systems for increasing the number of speech connections on existing pair or quad cables is becoming ever larger. Higher order multiplexing will probably also be utilized in this connection witin the next few years.

A change to PCM transmission on trunk- and rural cables is also in many cases competing with the alternative of laying new cables for expansion of the transmission capacity.

The possibility of transmission of digitally coded information, for example pulse code modulated speech, through pairs in symmetrical pair cables is, however, limited by certain factors. The cable attenuation limits of course the transmission distance through which the PCM signal can be transmitted with a given error probability at the detection.

In order to exceed this transmission distance digital amplifiers so called regenerators, must installed at suitable intervals. Moreover, crosstalk from other PCM systems in the same cable interferes with the transmission as for example the signalling of the telephone exchanges, adjacent railways, power lines and so on.

The crosstalk is caused by the capacitive and inductive imbalances between the pairs in the cable, and the difference in the crosstalk between the different pairs can be considerable. When the two transmission directions are to be installed in the same cable the number of pairs which can be utilized for PCM transmission as the quality of the respective transmissions is limited mainly by the so called near end crosstalk i.e. the crosstalk which arises in the cable between pairs which carries traffic in opposite directions. One speaks in connection with crosstalk about the disturbing pair or pairs and the disturbed pair respectively.

When projecting PCM cable sections one wants sections as long as possible for economical reasons. According to the above, however, the individual length of the cable sections is limited and consequently it will be necessary to closer investigate by means of measurements the influence of the cable attenuation and the disturbances as a function of the section length before the installation of the regenerators of the PCM system.

The quality criterion of a PCM system line is the average error frequency which occurs during transmission on the line. This must not exceed a certain value, for example $10^{-7}$.

When by measurements it is to be established whether an acceptable error frequency occurs on a pair of an already laid cable problems arise as the pairs often are only accessable at the end points of the cable. If the cable now is of such a length that a PCM transmission would demand one or several regenerators one consequently may neither for measuring purposes transfer a PCM signal on the disturbed pair between the end points of the cable nor execute a direct error frequency measurement with a disturbing signal of PCM type.

In order to avoid the above problems one measures according to a known method (Electrical Communication, Volume 47, No. 4, 1972) the suitability for PCM transmission of the different pairs in a cable the near end crosstalk between each of the pairs and a disturbing pair. As a disturbing signal a sinusoidal signal is used with a frequency which approximately coincides with the maximum frequency of the spectrum of the intended PCM signal. For a PCM transmission of 2 Mb/s this maximum lies approximately at 1 MHz. Via a band pass filter tuned to the transmitted signal frequency there is measured the extent to which the transmitted power is transferred to the disturbed pair. Owing to the fact that the frequency characteristic of the near end crosstalk attenuation undulates one cannot from the results according to the method carried out at one single frequency directly determine whether a certain pair is better adapted for PCM transmission than another, because the PCM signal is a broadband signal. By means of statistic calculations on the measuring results one can, however, get a certain feel about the number of PCM systems which can be installed on the cable as a function of the length of the cable section. By modifying the method, as has been proposed, in such a manner that the measurement is carried out at several frequencies of the sinusoidal signal or by using a PCM transmitter as a disturbing or noise source one can estimate the relative suitability of the different pairs for PCM transmission.

In the above described manner one can also estimate the disturbing influence on the PCM transmission of signalling between the stations. Common for the described methods is that the disturbance is measured as a power level on the disturbed pair. In order to obtain an idea of the error frequency caused by the noise on the disturbed pair during a PCM transmission the results must be translated into the time domain. In order to be able to do this correctly the amplitude spectrum of the crosstalk noise must be known. This is, however, not the case. Therefore one must make certain more or less correct assumptions concerning this spectrum.

A method for measuring in the time domain of the influence of near end crosstalk from a disturbing PCM system is also previously known from the above-mentioned publication. According to this method a real or simulated PCM signal is fed to a disturbing pair. The disturbance transferred to the disturbed pair by near end crosstalk is amplified in a variable amplifier and is added to an undisturbed PCM signal which first is attenuated in a variable cable simulator. The combined signal is fed to an ordinary PCM regenerator the output signal of which is tested in an error counting circuit with reference to errors in the used PCM code. By means of the variable cable simulator the influence of the disturbances as a function of the cable section length can be estimated and by increasing the amplification of the variable amplifier one can get lower and lower amplitudes in the transferred crosstalk disturbance to cause error at the regeneration. Thus for a certain detected error frequency and adjusted cable length such amplification is a measure of the actual disturbing margin between the disturbing and the disturbed pair. The drawback of the method is its complexity. Among other things a complicated cable simulator is required for the measuring equipment.

An object of the present invention is to provide a method and an apparatus for measurement directly in the time domain of the generated error frequency on a disturbed pair caused by near end crosstalk from one or more disturbing PCM systems or low frequency signalling systems.

The characteristics of the invention appear from the characterizing parts of the accompanying claims.

The invention will, in the following, be described more in detail with reference to the accompanying drawing in which:

FIG. 1 shows a block diagram of apparatus for performing near end crosstalk measurement according to a known method;

FIG. 2 shows a block diagram of apparatus for the measurement of the error frequency caused by near end crosstalk on a disturbed pair;

FIG. 3 shows a block diagram of apparatus for the error frequency measurement according to the invention;

Figure 4:
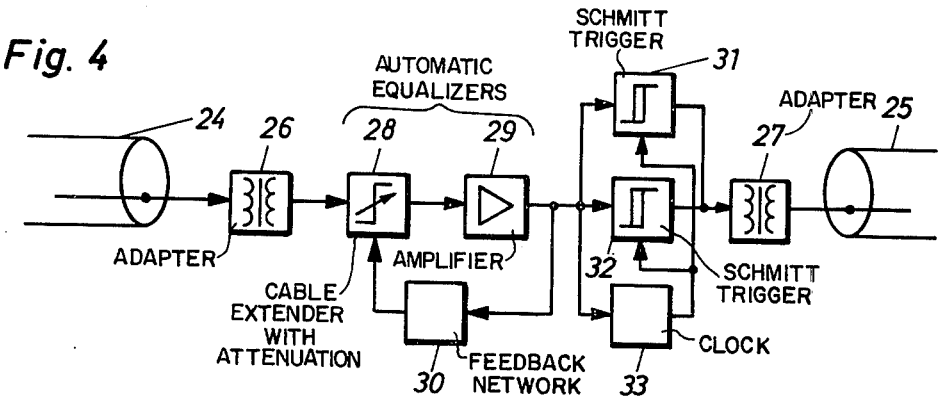
FIG. 4 shows schematically an ordinary PCM regenerator.

FIG. 1 shows the principle, for near end crosstalk measurement according to a known method. A disturbing pair 2 is fed from a disturbing signal source 1 connected to one end of the cable. The disturbing signal can be for example a sinusoidal signal of a frequency which equals the maximum frequency of the spectrum of the intended PCM system. A filter 5 of band pass type tuned to this frequency is connected to a disturbed pair 3, on which the measurement is to be executed. At the output of the band pass filter, there is measured by means of a power meter 6 the extent to which the transmitted power is transferred by crosstalk. This method has the above described drawbacks.

FIG. 2 shows a known principle for measurement of the error frequency caused by near end crosstalk on a disturbed pair. The disturbing pair 8 in the cable is fed from a PCM transmitter 7 connected to the same cable end as the measuring equipment. Disturbances transferred by crosstalk to the disturbed pair 9 are amplified in a variable amplifier 10 and are then fed to a summing circuit 11. A second PCM transmitter 13 is connected via a cable simulator 12 to a second input on said summing circuit 11. The superimposed signals, i.e. the known PCM signal from the transmitter 13 and the disturbances from the cable with adjustable amplitudes are fed to a regenerator 14 of conventional type. The regenerated PCM signal is tested in the test circuit 15 for errors in the used PCM code. This measuring method has the drawbacks discussed in connection with the description of the state of the art.

FIG. 3 shows the principle for error frequency measurement according to the invention. One or several disturbing PCM sources 16, 17 feed a corresponding number of pairs 21 in the cable. The point A represents an input to a pair 22 in the cable which can carry other disturbing signals as for example low frequency signals for transmission of information between stations in the network. A measuring equipment 18, 19 is connected to the disturbed pair 23. The apparatus 18 is a modified regenerator as hereinafter described and the unit 19 is an error counting circuit.

FIG. 4 shows the principle for a PCM regenerator of the type utilized by the invention. Via an adaption circuit or adapter 26 a PCM signal arrives from the cable section 24 on a pair. This signal due to the transfer over the cable section has been degenerated and consequently before it again is transmitted on the following cable section 25 must be regenerated. An automatic equalizer comprising a cable extending network 28, the attenuation of which can be adjusted, an amplifier 29 and a feed-back network 30 compensates for different cable lengths and is connected to the adaption circuit 26. The cable extending network 28 has often an attenuation characteristic which follows the square-root of the frequency. The amplifier 29 is adjusted for the maximal regenerator distance on the cable and deviations from this distance are automatically compensated for by means of the feed-back system 30. At the output of the equalizer a signal thus appears with steady nominal amplitude irrespective of the length of the incoming cable section. A clock-generator 33 connected to the output of the equalizer regenerates the correct bit time frequency from of the incoming PCM signal flow. This is accomplish as, for example, in a known apparatus by first rectifying the PCM signal and using the resulting signal as a control signal for a resonant circuit which emits pulse-formed output signals. To the output of the equalizer there are connected further two level sensing detector circuits 31, 32 of Schmitt trigger type, one for each signal polarity of the PCM signal flow. By means of the reestablished bit time frequency, the detector circuits are sampled, whereby a regenerated PCM signal is obtained, which via the adapter 27 is connected to a pair in the following cable section 25.

Figure 5:
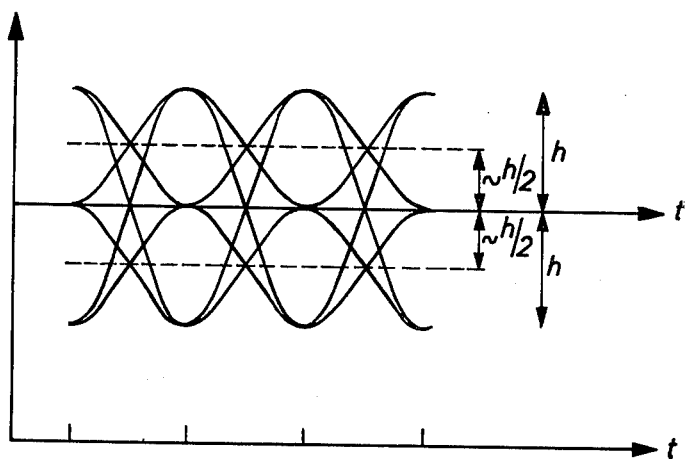
FIG. 5 shows the pattern for a 3-level coded PCM signal at the detection point.

FIG. 5 shows the so called "eye pattern" of a PCM signal at the output of the equalizer. It is assumed that the PCM signal is 3-level coded for example according to standard AMI (Alternate Mark Inversion) type. The equalized signal can then at the sampling instants marked on the lower time axis in the diagram take 3 different alternative values which can be designated with +1, 0, −1. If a number of signal sequences comprising such "1" or "0" are superimposed upon each other a diagram like the one shown is obtained. All transitions between the different levels are represented. The name "eye pattern" is derived from the fact that the open areas appearing in the diagram have been compared to eyes. Owing to disturbances, for example noise in the transmission the signal amplitude at different sampling instants will somewhat differ from each other causing the height $h$ of the eye to decrease. This is also the case in the presence of so called intersymbol interference which means that on each PCM pulse overshoots are superimposed from earlier pulses even in the absence of noise. A real eye pattern has thus a somewhat smaller vertical eye opening than that shown in FIG. 5. The threshold values for the circuits 31 and 32 according to FIG. 4 are in the theoretical case suitably chosen symmetrically in the centre of each eye. The detector circuits then decide if the signal amplitude exceeds or is below the threshold value.

By observing the eye pattern in the diagram one sees that a disturbance for example caused by crosstalk has to have an amplitude larger than half the $h$ at the sampling instant in order to cause an erroneous decision. In order to compensate for the smaller eye opening caused by the disturbances, the critical disturbance amplitude can be set to a lower value, which for example can be determined empirically. On the other hand a disturbance with an amplitude larger than half the $h$ causes errors in 3 cases out of 4 if the information "0" and "1" is presumed to be equally probable. For example a positive disturbance superimposed on a positive PCM pulse larger or smaller than half the $h$ value causes no error.

The idea behind this invention is derived from the understanding of the fact that a PCM signal transferred on a pair and the disturbances added to this signal by crosstalk are mathematically uncorrelated. Consequently the error frequency can be measured without using a PCM signal on which disturbances are then superimposed as is the case in the method according to FIG. 2. According to the invention the amplitudes of the disturbances are sampled in a regenerator after equalization with a sampling frequency which coincide with the bit time frequency of the PCM signal intended for transmission and the number of detected values which exceed the threshold value according to the above are counted.

Figure 6:
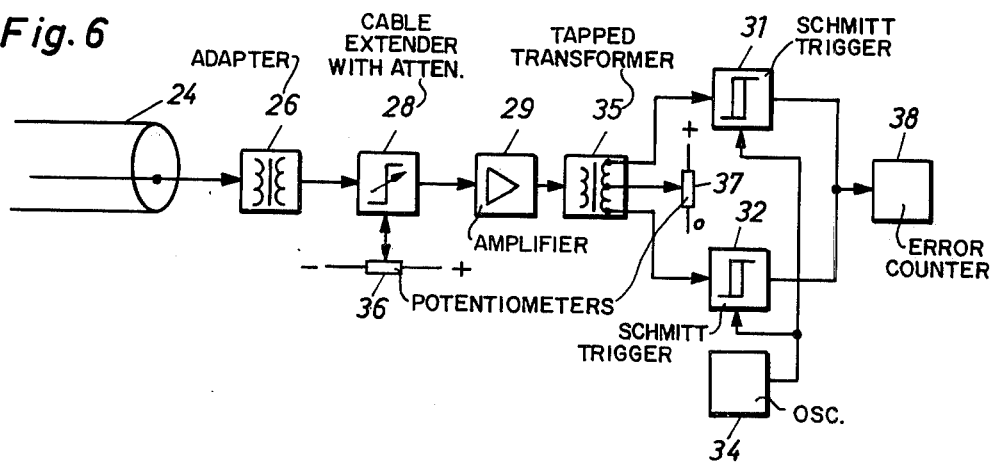
FIG. 6 shows schematically a modified regenerator according to FIG. 4 as it is used for carrying out the method according to the invention.

In FIG. 6 a modified regenerator is shown for execution of the method according to the invention. The error frequency measurement is executed as shown in FIG. 3. The modified regenerator 18 according to this figure comprises the blocks 26–37 in FIG. 6. The error counter circuit 38 corresponds to the unit 19 according to FIG. 3. Thus only disturbances transferred by crosstalk arrive on the pair from the cable 24. Units which have direct correspondence in FIG. 4 have the same reference number. In the equalizer the feed-back loop has been broken up and the attenuation in the cable extending network is adjusted manually by means of a potentiometer 36. As no PCM signal is transferred no bit time signal can be regenerated. Instead a free-running oscillator 34 tuned to the bit time frequency of the intended PCM signal samples the detector circuits 31 and 32. By means of a potentiometer 37, the tapping of which is connected to the tapping of a transformer 35 on the output from the equalizer, the eye pattern can be displaced relatively the fixed detector thresholds of the detector circuits. Herewith, the intersymbol interference according to the above can be compensated for. For achieving this function adjustable threshold levels in the respective detector circuits 31, 32 would be equally useful.

A measurement of the error frequency caused by the crosstalk is made as follows. The cable section length which is to be studied is adjusted by means of the potentiometer 36. The critical disturbance amplitude is then adjusted by means of the potentiometer 37 according to the above and the number of detected disturbing pulses having amplitudes exceeding the threshold value is summed up in the error counting circuit 38. The corresponding error frequency which a PCM system would have had is obtained from the relation $$P_E = \frac{3}{4} \cdot (n/2.t) \cdot 10^{-6}$$

at an assumed frequency of 2 Mb/s. The number of counted disturbing pulses during the time $t$ seconds have been designated with $n$. As the disturbances have been amplified in an equalizer of the same type as in an ordinary PCM regenerator this simple measuring process gives an exact agreement with the actual situation.

By varying the potentiometer 36 one can easily execute the measurements for different cable lengths and verify the critical length. Furthermore the measuring method makes possible the choice of the best pair for transmission of PCM in a certain telephone cable.

The modified PCM regenerator can also be used for evaluation of the suitability of a cable for PCM transmission. For this purpose one measures at present the attenuation of the cable and possibly its phase as a function of the frequency. One can instead in a modified regenerator according to the above displace the threshold levels until a certain error frequency is obtained. This displacement is namely a direct measure of the quality of the equalization and the margin for disturbances. This measurement demands, however, that a PCM signal is transmitted through the cable on the disturbed pair i.e. that the cable section is accessable at both the ends. In this case the detector circuits are sampled with a clock signal regenerated from the incoming PCM signal as is described in connection with FIG. 4 above.

Figure 7:
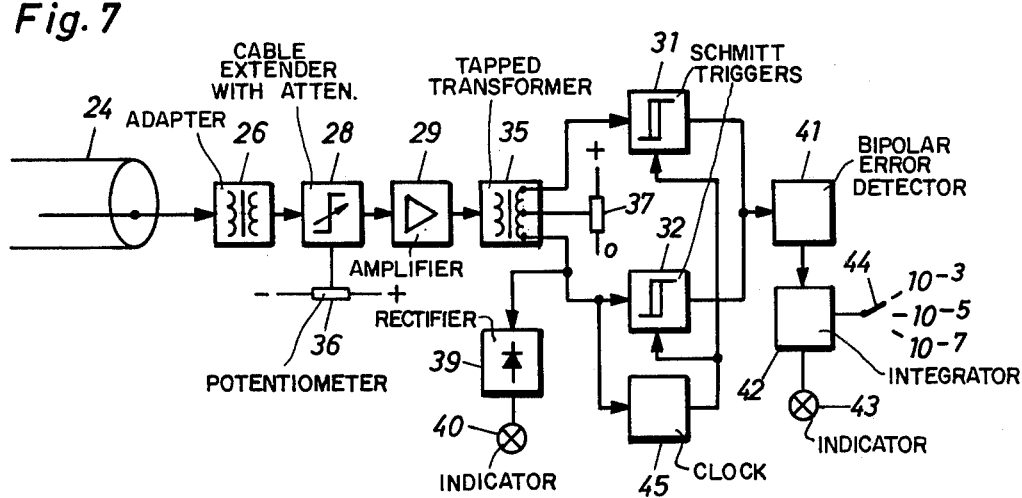
FIG. 7 shows another embodiment of the modified regenerator adapted for a second type of measurement.

In FIG. 7 an embodiment of the modified regenerator is shown adapted for the above measurement.

Units with the same function as in the arrangement according to FIG. 6 has been given the same reference numbers. Connected to the output of the equalizer is a rectifier 39 and an indicator 40 for example realized as a light emitting diode (LED) which is activated when the output signal has nominal level. As in the regenerator showed in FIG. 4 correct bit time frequency is obtained from the PCM flow in the clock generator 45, and the detector circuits are sampled with this frequency. To the common output of the detector circuits is in this embodiment connected a conventional bipolar error detector 41 in series with an integrator 42 and an indicator 43. For each detected error the error detector 41 gives a pulse on its output. The integrator 42 which is provided with a device 44 for setting of different error frequencies integrates the error pulses at the input and gives an output signal when the set error frequency is exceeded.

The measurement procedure with the apparatus according to FIG. 7 is carried out as follows. By means of the potentiometer 36 a nominal level at the output of the equalizer is adjusted, the indicator 40 being activated. After that the displacement of the eye pattern which can be made by means of the potentiometer 37 before the set error frequency in the integrator 42 is exceeded is measured. The measured displacement is, as is previously mentioned, a measure of the quality of the equalization and the margin for disturbances.

We claim:

1. A method for measuring in a cable especially a telephone cable the bit error frequency caused by crosstalk from at least one disturbing pair on which is transmitted for example a PCM signal to a given length of a disturbed pair intended for transmission of a 3-level coded PCM signal, characterized in that
   a. the disturbances transferred to the disturbed pair by crosstalk are equalized in correspondence to the given cable length,
   b. at times determined by the bit time frequency of the intended PCM signal are determined whether the magnitude of the equalized disturbances exceed a critical disturbing level which negligibly deviates from half the vertical eye opening in the eye pattern of the PCM signal intended for transmission being equalized to the same degree, and c. during a given time positive outcome of the determination whether the magnitude of the equalized disturbances exceed said critical level are added, the corresponding error frequency which the intended PCM signal would have shown when transmitted via the cable length corresponding to the equalization being proportional to the obtained sum and inversely proportional to said given time.

2. Measuring apparatus for executing the method according to claim 1 relating to measurement in a cable intended preferably for telephony of the bit error frequency caused by crosstalk from at least one disturbing pair on which is transmitted for example a PCM signal to a given length of a disturbed pair intended for transmission of a 3-level coded PCM signal, characterized in that it comprises a. a manually adjustable equalizer to the input of which the disturbed pair is connected and thus feeds the disturbances transferred by crosstalk, b. two level detecting circuits with binary output, preferably of Schmitt trigger type, one for each disturbing polarity and with equal detecting level magnitudes with its respective inputs connected to the output of the equalizer, c. a free-running clock generator with its output connected to a sampling pulse input on each detecting circuit and arranged to synchronously sample the detection, d. an error counting circuit with its input connected to the output of each detecting circuit in order to register the number of events that the magnitude of the equalized disturbances exceed the threshold level of the detecting circuits the corresponding error frequency which the intended PCM signal would have shown when transmitted via the cable length corresponding to the equalization being proportional to the number of registrations and inversely proportional to the used registration time.

3. Measuring apparatus according to claim 2, characterized in that said equalizer comprises a series-connection of a manually variable cable extension network with an attenuation characteristic which follows the square-root of the frequency, an amplifier and an output circuit in the form of a transformer with a secondary centre-tap which in its turn is connected to the tapping of a voltage devider by means of which the eye pattern of the equalized signal can be displaced compared to a fixed level.

4. Measuring apparatus according to claim 2, characterized in that said threshold values have individually adjustable detecting levels.

5. A method for measuring in a cable the bit error frequency caused by crosstalk from at least one disturbing pair on which is transmitted pulse signals to a given length of a disturbed pair intended for transmission of a 3-level coded PCM signal comprising the steps of equalizing in correspondence with the given length of the disturbed pair the disturbances transferred to the disturbed pair by crosstalk, determining at times established by the bit time frequency of said PCM signal whether the magnitude of the equalized disturbances exceed a critical disturbing level related to said PCM signal, and, during a given time interval accumulating the number of instances the magnitude of the equalized disturbances exceed said critical disturbing level, whereby the corresponding error frequency which the said PCM signal would show when transmitted via the cable length corresponding to the equalizing cable length is proportional to the accumulated number and inversely proportional to said given time interval.

6. The method of claim 5 wherein said critical disturbance level is related to the eye pattern of said PCM signal.

7. The method of claim 5 wherein said critical disturbance level is approximately equal to one half the height of the vertical eye opening in said eye pattern.

8. Apparatus for measuring in a multipair cable the bit error frequency caused by crosstalk from one disturbing pair on which are transmitted pulse signals to a given length of a disturbed pair intended for transmission of a 3-level coded PCM signal, comprising: a manually adjustable equalizer having an input connected to the disturbed pair; two level detecting circuits, each of said level detecting circuits having a disturbance signal input connected to the output of said equalizer, each of said circuits having a sampling input and means in response to a signal at the sampling input for emitting a signal of a given level only when the amplitude of the signal at its disturbing signal input exceeds a given amplitude, one of said circuits being only operative for positive polarity signals, the other of said circuits being operative for only negative polarity signals; a free-running clock generator means having an output connected to the sampling input of each level detecting circuit for synchronous sampling; and an error counting means having an input connected to the output of each level detecting circuit for registering the number of instances that the magnitude of the equalized disturbances exceed the threshold level of the level detecting circuits whereby the corresponding error frequency which the intended PCM signal would show when transmitted via the cable length corresponding to the equalization length is proportional to to the number of registrations and inversely proportional to the time required to obtain said number of registrations.

9. Measuring apparatus according to claim 8, wherein said equalizer comprises a variable cable extension network with an attenuation characteristic which follows the square-root of the frequency, an amplifier and an output circuit connected in series, said output circuit comprising a transformer with a secondary center tap and a voltage divider connected to said center tap.

* * * * *